US012766925B2

(12) United States Patent
Lauwers et al.

(10) Patent No.: US 12,766,925 B2
(45) Date of Patent: Oct. 20, 2026

(54) ROOF ASSEMBLY FOR A CAB OF A WORK VEHICLE WITH INTERNAL STORAGE AND RELATED COOLING SYSTEM FOR HEAT-GENERATING COMPONENTS STORED THEREIN

(71) Applicant: CNH Industrial America LLC, New Holland, PA (US)

(72) Inventors: Andrew Victor Lauwers, Sandusky, OH (US); Christian Mayer, Neukirchen an der Enknach (AT)

(73) Assignee: CNH Industrial America LLC, New Holland, PA (US)

( * ) Notice: Subject to any disclaimer, the term of this patent is extended or adjusted under 35 U.S.C. 154(b) by 335 days.

(21) Appl. No.: 18/531,294

(22) Filed: Dec. 6, 2023

(65) Prior Publication Data

US 2024/0181844 A1 Jun. 6, 2024

Related U.S. Application Data

(60) Provisional application No. 63/430,554, filed on Dec. 6, 2022, provisional application No. 63/430,562, filed on Dec. 6, 2022.

(51) Int. Cl.

| | |
|---|---|
| ***B60H 1/24*** | (2006.01) |
| ***B60R 21/02*** | (2006.01) |
| ***B62D 25/06*** | (2006.01) |
| *B60R 21/00* | (2006.01) |
| *B62D 49/06* | (2006.01) |

(52) U.S. Cl.
CPC ............ *B60H 1/245* (2013.01); *B62D 25/06* (2013.01); *B60R 2021/0081* (2013.01); *B60R 21/02* (2013.01); *B62D 49/06* (2013.01)

(58) Field of Classification Search
CPC .... B60H 1/245; B60H 1/00564; B60H 1/262; B62D 25/06; B62D 49/06; H05K 7/20145
See application file for complete search history.

(56) References Cited

U.S. PATENT DOCUMENTS

| | | | | |
|---|---|---|---|---|
| 7,484,793 B2 * | 2/2009 | Baro | B60H 1/00378 | 296/190.09 |
| 2004/0144850 A1 * | 7/2004 | Shuttleworth | B60H 1/245 | 237/12 |
| 2014/0083784 A1 * | 3/2014 | Fukunaga | B60H 1/00378 | 903/903 |
| 2016/0039262 A1 * | 2/2016 | Gielda | B62D 33/0617 | 296/190.09 |
| 2016/0355077 A1 * | 12/2016 | Hingne | B60J 7/12 | |
| 2021/0307193 A1 * | 9/2021 | Badie | H01M 10/613 | |

FOREIGN PATENT DOCUMENTS

| | | | | |
|---|---|---|---|---|
| DE | 202017101238 U1 * | 3/2017 | B60L 9/04 | |
| KR | 20150106178 A * | 9/2015 | B60H 1/241 | |

* cited by examiner

*Primary Examiner* — Daniel J Colilla
(74) *Attorney, Agent, or Firm* — Dority & Manning, P.A.

(57) ABSTRACT

In one aspect, a roof assembly for an operator's cab of a work vehicle includes internal storage for storing one or more heat-generating components and incorporates a cooling system for directing an airflow through the roof assembly for cooling such components.

19 Claims, 10 Drawing Sheets

ROOF ASSEMBLY FOR A CAB OF A WORK VEHICLE WITH INTERNAL STORAGE AND RELATED COOLING SYSTEM FOR HEAT-GENERATING COMPONENTS STORED THEREIN

CROSS-REFERENCE TO RELATED APPLICATIONS

The present application is based upon and claims the right of priority to U.S. Provisional Patent Application Nos. 63/430,554 and 63/430,562, both filed on Dec. 6, 2022, the disclosures of which are hereby incorporated by reference herein in their entirety for all purposes.

FIELD OF THE INVENTION

The present disclosure generally relates to work vehicles and, more particularly, to a roof assembly for an operator's cab of a work vehicle that includes internal storage and that incorporates a cooling system for cooling heat-generating components stored therein.

BACKGROUND OF THE INVENTION

Work vehicles, such as construction vehicles and agricultural vehicles, typically include a cab defining an enclosed operating environment for the operator. In addition to providing a location for the operator on the work vehicle, the cab also typically house various devices or components for controlling the operation of the work vehicle and/or providing one or more functions of the work vehicle.

As the functionality of work vehicles increases, including the ability to operate in partially autonomous, semi-autonomous, and autonomous modes and the ability to provide certain driver assistance features, the number of corresponding electronic components that must be housed within the cab similarly increases. To address this issue, it has been proposed to utilize the roof of the cab for storage space. However, designing the roof in this manner is complex and presents numerous issues.

For instance, to provide storage space for components within the roof, one solution is to significantly increase the vertical height or profile of the roof. However, an excessively tall roof can be aesthetically undesirable and can lead to the work vehicle exceeding maximum height requirements. Moreover, to accommodate the desired component storage, one solution is to eliminate the opening or viewing window typically provided in the roof of the cab. However, such a solution impedes the operator's upward visibility and is particularly problematic for work vehicles that include a loader assembly attachment.

Additionally, when storing electronic or other heat-generating components within the roof, such components typically require some amount of cooling. In this regard, challenges exist in directing the required airflow through the roof to provide the required amount of cooling for these heat-generating components. Furthermore, certain health and safety regulations may require that a work vehicle include a Falling Object Protective Structure (FOPS) located within the roof to protect the operator from falling objects. This often takes the form of a large metal plate or reinforced roof structure positioned within the roof. Unfortunately, it can be difficult to incorporate such a FOPS component into the roof while also attempting to provide storage space for additional components.

Accordingly, a need exists for an improved roof design that addresses one or more of the issues identified above.

SUMMARY OF THE INVENTION

Aspects and advantages of the technology will be set forth in part in the following description, or may be obvious from the description, or may be learned through practice of the technology.

In one aspect, the present subject matter is directed to a roof assembly configured for use with an operator's cab for a work vehicle. The roof assembly includes an outer housing including at least one air intake port provided along at least one lateral side of the outer housing and at least one air outlet port provided along an aft end of the outer housing. The roof assembly also includes first and second roof members positioned within the outer housing, with the first and second roof members collectively defining at least one airflow channel extending between the at least one air intake port and the at least one air outlet port for directing an airflow through an interior of the outer housing. The airflow is used to cool at least one heat-generating component positioned within the outer housing.

In another aspect, the present subject matter is directed to a roof assembly configured for use with an operator's cab for a work vehicle. The roof assembly includes an outer housing and an inner storage compartment positioned within the outer housing, with the inner storage compartment being configured to house at least one electronic component therein. Additionally, the roof assembly includes at least one isolation mount coupling the inner storage compartment to an adjacent component of the roof assembly. The at least one isolation mount is configured to reduce an amount of vibrations transmitted between the adjacent component and the inner storage compartment.

In a further aspect, the present subject matter is directed to a roof assembly configured for use with an operator's cab for a work vehicle. The roof assembly includes an outer housing and an inner storage compartment positioned within the outer housing. The inner storage compartment is configured to house at least one electronic component therein as well as function as a Falling Objects Protective Structure (FOPS) component for the work vehicle.

In one aspect, the present subject matter is directed to a roof assembly configured in accordance with one or more of the embodiments described herein.

In another aspect, the present subject matter is directed to an operator's cab including a roof assembly configured in accordance with one or more of the embodiments described herein.

In further aspect, the present subject matter is directed to a work vehicle including an operator's cab, with the operator's cab including a roof assembly configured in accordance with one or more of the embodiments described herein.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
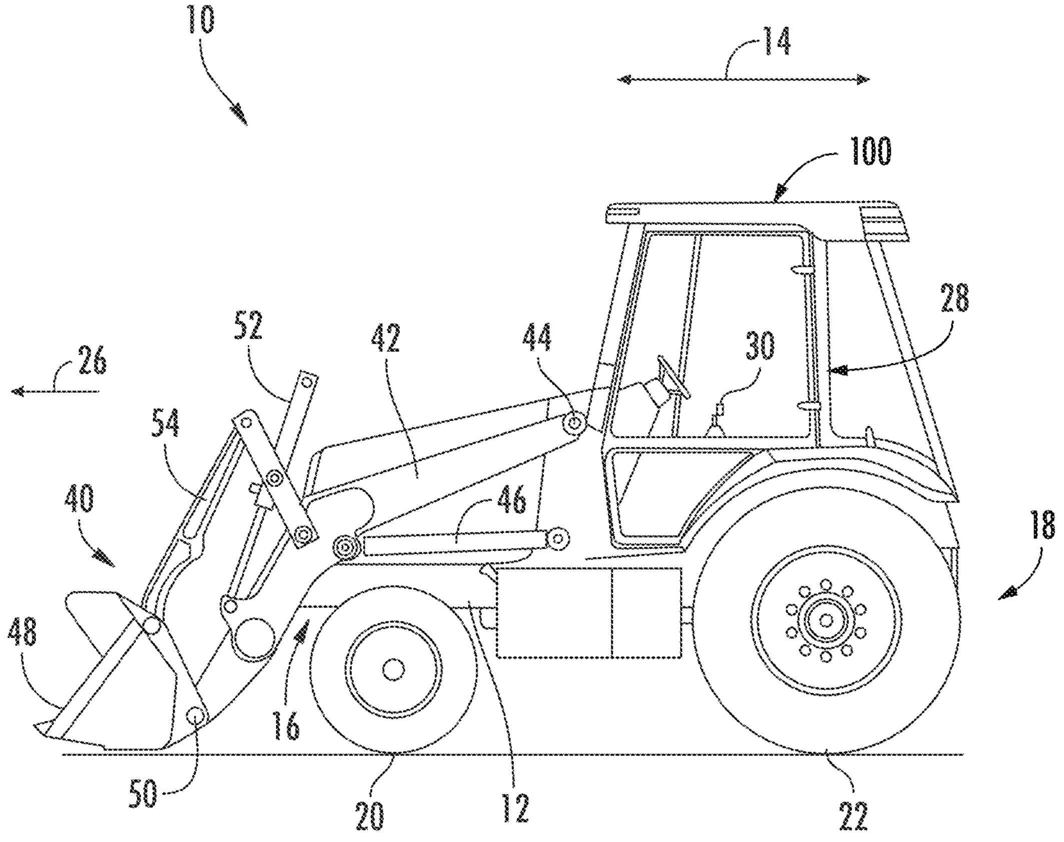
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a roof assembly for an operator's cab of a work vehicle. In several embodiments, the roof assembly may be configured to incorporate internal storage space for housing one or more components of the work vehicle, such as one or more electronic components of the work vehicle. For instance, the roof assembly may be configured to house one or more computing devices (e.g., one or more processor-based devices, such as one or more electronic control units (ECUs) or controllers), one or more telemetry-related or communications-related components (e.g., modems, routers, antennas, receivers, GPS modules, etc.), and/or various other components of the work vehicle. In one embodiment, the various components housed within the roof assembly may be used at least in part to accommodate partially autonomous, semi-autonomous, and autonomous operating modes of the work vehicle and/or to provide driver assistance features.

Additionally, in several embodiments, the roof assembly may be configured to house various components of the work vehicle without requiring an excessively large profile and/or without impacting an operator's ability to operate the machine safely and effectively. Specifically, in one embodiment, the internal storage volume within the roof assembly may be accommodated within a relatively low vertical profile while still allowing a visibility window to be defined through the roof assembly, thereby providing the operator with a "view-through" the roof assembly that can be advantageous depending on the type of operation being performed within the work vehicle. For instance, when the work vehicle is equipped with a loader assembly, the visibility window may provide the operator with a view of the top end of the boom and the associated implement (e.g., a bucket) when the boom is moved towards its fully raised position.

Moreover, in several embodiments, the roof assembly may incorporate a cooling system (or simply one or more cooling components) for cooling one or more heat-generating components housed therein. Specifically, in one embodiment, the roof assembly make include internal roof members or plates that, when assembled, define internal ducts or airflow channels within the roof assembly. Additionally, one or more air intake ports/openings may be defined along one or both of the sides of the roof assembly while one or more air outlet ports/openings may be defined along the rear or aft end of the roof assembly, thereby allowing an airflow received at the air intake ports/openings positioned along the sides of the roof assembly to be directed through the internal airflow channels for cooling one or more heat-generating components and subsequently expelled from the roof assembly via the air outlet ports/openings positioned at the aft end thereof. In one embodiment, the roof assembly may be equipped to allow separate, isolated airflows to be directed through the roof assembly (e.g., through separate ducts or airflow channels defined via the internal roof members), thereby permitting the independent cooling of separate heat-generating components. It should be appreciated that, in alternative embodiments, the cooling system may rely on liquid-based cooling as opposed to air-based cooling.

Further, in several embodiments, the roof assembly may be configured to include an inner enclosure or storage compartment that is positioned within an outer shell or housing of the roof assembly. The inner storage compartment may, in one embodiment, be configured to perform a multi-function, including enclosing or encasing one or more electronic components of the work vehicle, serving as a Falling Object Protective Structure (FOPS) component for the work vehicle, and functioning as an electromagnetic compatibility (EMC) cover for the components housed therein (e.g., with the compartment being grounded with the chassis/cab frame). Specifically, in accordance with aspects of the present subject matter, the inner storage compartment may correspond to a box-like structure that defines internal storage space for housing one or more components. Additionally, this box-like structure may be formed from a rigid material or may otherwise have a suitable configuration that allows the storage compartment to shield the operator's cab from falling objects (e.g., objects falling from an implement of a loader assembly when the boom is raised above the cab). As will be described below, given the rigid nature of the inner storage compartment, such compartment may, in one embodiment, be configured to be supported or coupled relative to the remainder of the roof assembly via isolation mounts that reduce the amount of vibration transferred to the inner storage compartment from the remainder of the roof assembly. Such vibration dampening allows for the storage compartment to support sensitive electronic components that might otherwise be impacted by the vibrations transmitted through the roof assembly.

Referring now to the drawings, FIG. 1 illustrates a side view of one embodiment of a work vehicle 10 in accordance with aspects of the present subject matter. As shown, the work vehicle 10 is configured as a tractor including a loader assembly attachment. However, in other embodiments, aspects of the present subject matter may also be utilized within other work vehicles, such as various construction vehicles or agricultural vehicles. For instance, in one embodiment, aspects of the present subject matter may be advantageously utilized with wheel loaders, skid-steer loaders, bulldozers, agricultural tractors, harvesters, and/or the like.

As shown in FIG. 1, the work vehicle 10 includes a frame or chassis 12 extending in a longitudinal direction (indicated by arrow 14 in FIG. 1) of the vehicle between a forward end 16 of the chassis 12 and an aft end 18 of the chassis 12. In general, the chassis 12 may be configured to support or couple to a plurality of components. For example, a pair of steerable front traction devices (e.g., front wheels 20 (one of which is shown)) and a pair of driven rear traction devices (e.g., rear wheels 22 (one of which is shown)) may be coupled to the chassis 12. The wheels 20, 22 may be configured to support the work vehicle 10 relative to a ground surface 24 and move the vehicle 10 along the ground surface 24 in a direction of travel, such as a forward direction of travel (e.g., as indicated by arrow 26 in FIG. 1). However, in alternative embodiments, the front wheels 20 may be driven in addition to or in lieu of the rear wheels 22. Additionally, an operator's cab 28 may be supported between the forward and aft ends 16, 18 of the chassis 12, and may house one or more operator control devices 30 (e.g., a joystick(s), a lever(s), and/or the like) for permitting an operator to control the operation of the work vehicle 10.

The work vehicle 10 also includes a power source (not shown) for providing power to allow one or both sets of traction devices. In an embodiment in which the work vehicle 10 is configured as an electric vehicle, the power source may correspond to a battery module including one or more batteries and associated components for providing electrical power to drive one or more electric traction motors that rotationally drive the traction devices of the vehicle 10 (e.g., directly or through a drivetrain, such as a transmission and/or the like). Alternatively, in an embodiment in which the work vehicle 10 is configured as a conventional, non-electric work vehicle, the power source may correspond to an engine for providing mechanical power to rotationally drive the traction devices via an associated drivetrain of the work vehicle 10 (e.g., a transmission and axle assembly). In other embodiments, the work vehicle 10 may correspond to a hybrid-electric vehicle and/or a fuel cell electric vehicle.

Additionally, the work vehicle 10 includes a loader assembly 40 supported by or relative the chassis 12 at or adjacent to its forward end 16. As shown in FIG. 1, the loader assembly 40 includes a boom 42 pivotably coupled or supported relative to the chassis 12 at a boom pivot point 44, and a boom lift cylinder 46 secured between the boom 42 and the chassis 12. In such an embodiment, extension/retraction of the boom lift cylinder 46 may result in the boom 42 pivoting upwards/downwards about its respective pivot point 44, thereby allowing the positioning of the boom 42 relative to both the chassis 12 and the ground surface 24 to be adjusted, as desired.

Moreover, as shown in FIG. 1, the loader assembly 40 further includes a work implement 48, such as a loader bucket, coupled to the boom 42 at an implement pivot point 50, and an implement tilt cylinder 52 secured between the work implement 48 (e.g., via a linkage(s) 54) and a portion of the boom 42. As such, extension/retraction of the implement tilt cylinder 52 may result in the work implement 48 pivoting upwards/downwards relative to the boom 42 about its respective pivot point 50, thereby permitting the tilt angle or orientation of the implement 48 to be adjusted, as desired. Thus, by controlling the operation of the lift and tilt cylinders 46, 52 of the loader assembly 40, the vertical positioning and orientation of work implement 48 may be adjusted to allow for the execution of one or more operations, such as one or more material-moving operations.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For instance, in alternative embodiment, the work vehicle 10 need not include the loader assembly attachment, which is a configuration common with agricultural tractors.

In accordance with aspects of the present subject matter, the operator's cab of a work vehicle (e.g., the cab 28 of the work vehicle 10 described above) may include a roof assembly (e.g., roof assembly 100 shown in FIG. 1) for covering the top or upper end of the cab. In several embodiments, the roof assembly may be configured to function as a conventional roof for the operator's cab as well as a storage compartment for housing various components of the work vehicle, such as one or more computing devices (e.g., electronic control units ("ECUs") or other controllers), power distribution modules, telemetry/connectivity devices (e.g., routers, modems, GPS receivers, other antennas, etc.), and/or the like. For instance, in one embodiment, the roof assembly may be configured to house a "smart box" enclosure or inner storage compartment containing various components that assist in providing for operation of the work vehicle in a partially autonomous, semi-autonomous, and/or autonomous mode and/or for providing one or more driver assistance features.

As will be described below, the roof assembly may incorporate an integrated cooling system to accommodate any heat-generating components housed therein. For instance, the roof assembly may incorporate or define ducting or airflow channels that allow for air to be directed through the roof assembly for cooling one or more heat-generating components positioned therein, such as one or more computing devices contained within the inner storage compartment of the roof assembly. Additionally, the cooling system may include one or more heat transfer components (e.g., one or more heat sinks) for dissipating heat from one or more of the heat-generating components, as well as one or more fans for generating an airflow through the roof assembly and one or more filters for filtering or regulating the airflow through the roof assembly.

Additionally, as will be described below, the inner storage compartment of the roof assembly may, in several embodiments, serve multiple roles by functioning as a FOPS component of the work vehicle in addition to encasing or enclosing one or more internal components of the roof assembly and functioning as an EMC cover for the components housed therein. For instance, the inner storage compartment may correspond to a rigid box-like structure that is designed or rated to absorb the impact of a falling object onto the roof assembly (e.g., an object falling from the loader assembly when the boom is at a raised position).

Figure 2:
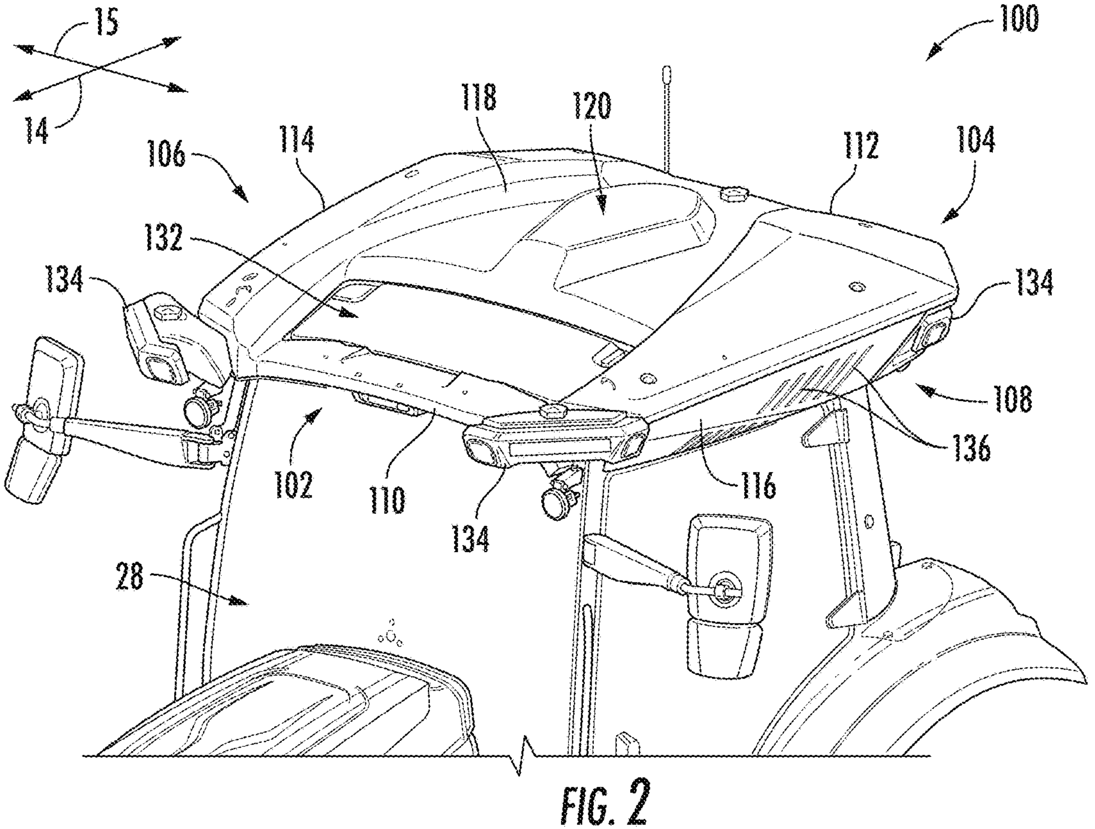
FIG. 2 illustrates a front perspective view of one embodiment of a roof assembly positioned on top of an operator's cab in accordance with aspects of the present subject matter, particularly illustrating an outer housing of the roof assembly in solid view.
Figure 3:
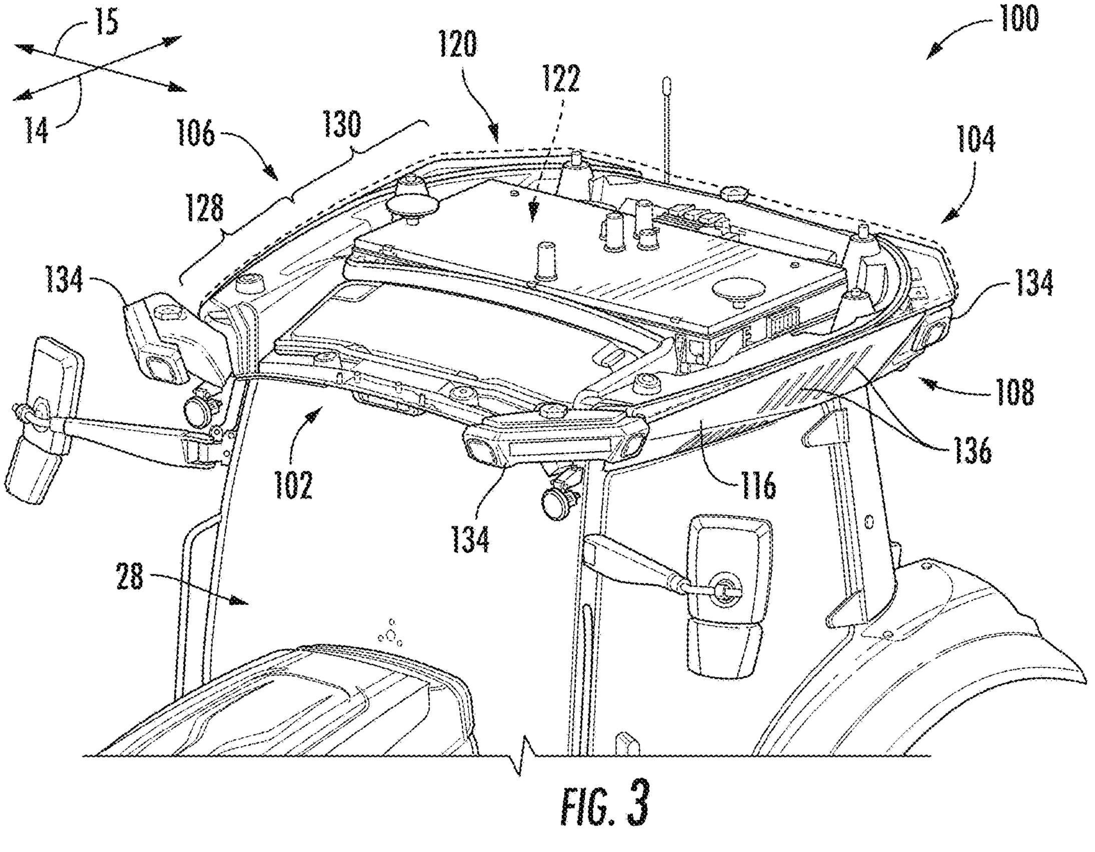
FIG. 3 illustrates another front perspective view of the roof assembly shown in FIG. 2, particularly illustrating the outer housing in a partially transparent view to allow the components positioned therein to be partially visible.
Figure 4:
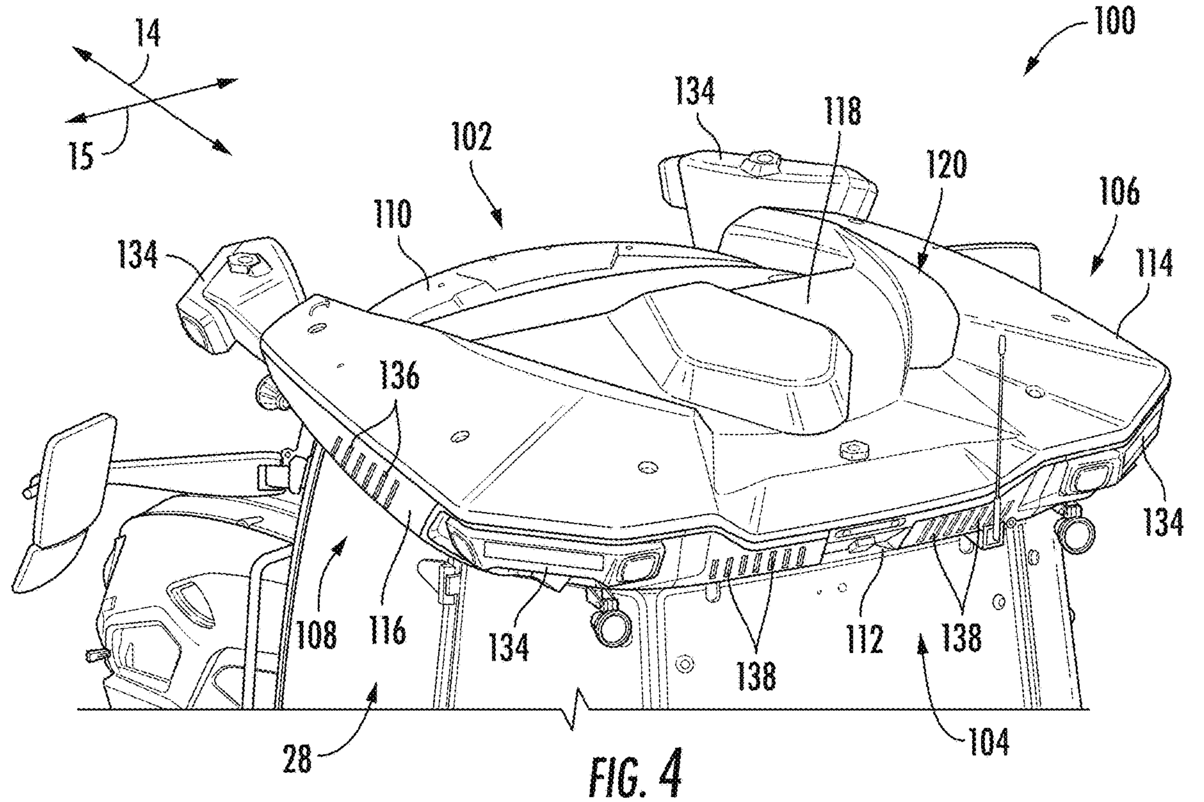
FIG. 4 illustrates a rear perspective view of the roof assembly shown in FIG. 2, particularly illustrating the outer housing in solid view.
Figure 5:
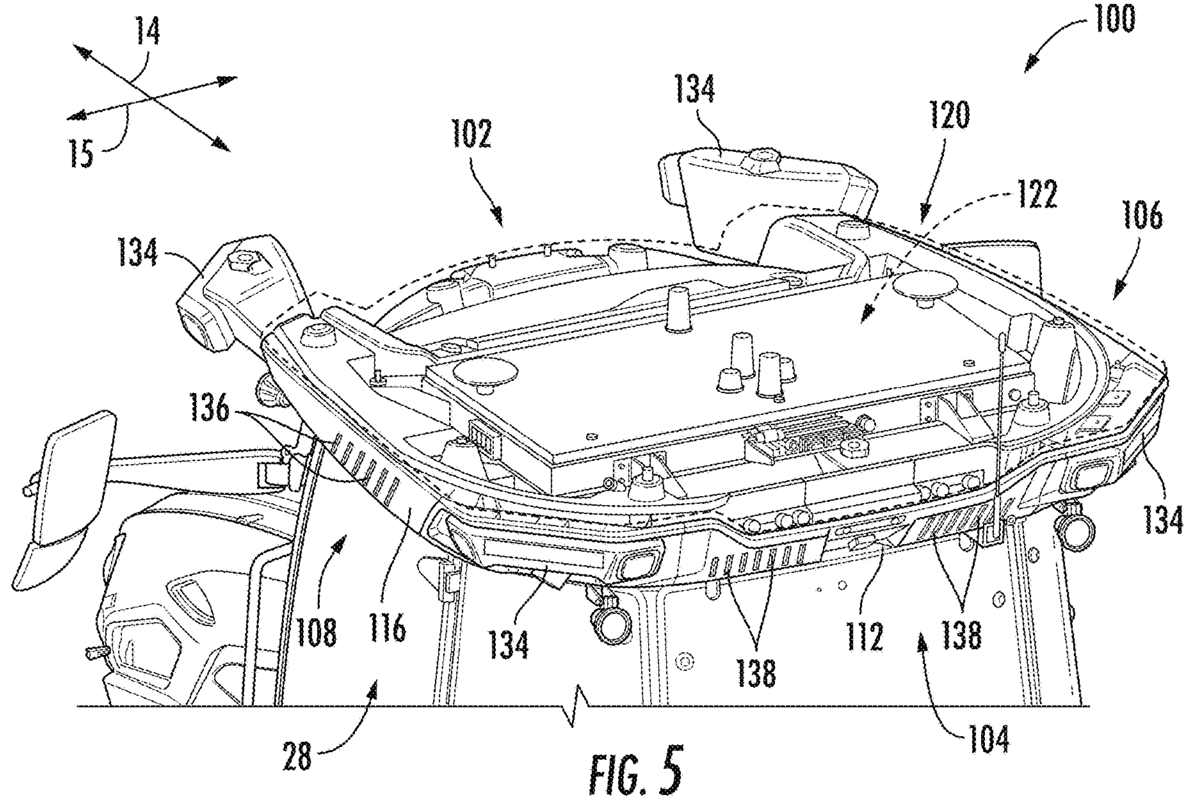
FIG. 5 illustrates another rear perspective view of the roof assembly shown in FIG. 4, particularly illustrating the outer housing in a partially transparent view to allow the components positioned therein to be partially visible.

Referring now to FIG. 2-5, partial, perspective views of an operator's cab 28 of a work vehicle is illustrated in accordance with aspects of the present subject matter, particularly illustrating one embodiment of a roof assembly 100 positioned at the top of the operator's cab 28. Specifically, FIGS. 2 and 3 illustrate front perspective views of the roof assembly 100, with an upper portion of an outer housing of the roof assembly 100 being shown in a sold view in FIG. 2 and in a partially transparent view in FIG. 3 (e.g., to show the various internal components housed therein). Additionally, FIGS. 4 and 5 illustrate rear perspective views of the roof assembly 100, with the upper portion of the outer housing of the roof assembly 100 being shown in a sold view in FIG. 4 and in a partially transparent view in FIG. 5 (e.g., to show the various internal components housed therein). For purposes of discussion, the roof assembly 100 will generally be described herein with reference to the work vehicle 10 shown and described above with reference to FIG. 1. However, it should be appreciated that the disclosed roof assembly 100 may generally be utilized with any suitable work vehicle having any suitable vehicle configuration.

As shown in FIGS. 2-5, the roof assembly 100 generally extends across the top of the operator's cab 28 in the longitudinal direction 14 of the work vehicle 10 between a forward end 102 and an aft end 104 of the roof assembly 100 and in a lateral direction 15 of the work vehicle 10 between a first lateral side 106 and a second lateral side 108 of the roof assembly 100. The roof assembly 100 generally includes a forward wall 110 positioned at the forward end 102 of the roof assembly 100, an aft wall 112 positioned at the aft end 104 of the roof assembly 100 and first and second sidewalls 114, 116 extending along the first and second lateral sides 106, 108, respectively, of the work vehicle 10. Additionally, the roof assembly includes a top portion or wall 118 extending across the top side of the roof assembly 100 and a bottom portion or wall (not shown) extending across the bottom side of the roof assembly 100. As is generally understood, the bottom wall of the roof assembly 100 may face downwardly towards the interior of the operator's cab 28 while the top wall 118 of the roof assembly 100 may face upwardly away from the interior of the operator's cab 28.

In one embodiment, the various exterior walls of the roof assembly 100 (e.g., the forward wall 110, aft wall 112, sidewalls 114, 116, top wall 118, and bottom wall) all form part of or are otherwise defined by an outer shell or housing 120 of the roof assembly 100. In one embodiment, the outer housing 120 may be formed, itself, by two or more housing components that are assembled together, such as a top shell component and a bottom shell component (e.g., see FIGS. 9-11). As will be described below, the outer housing 120 may encase various internal components of the roof assembly 100, including an inner storage compartment 122 (FIGS. 3 and 5) that houses various electronic components (e.g., computing devices, telemetry/communications devices, etc.) and one or more internal roof support plates or members 124A, 124B (e.g., see FIGS. 6-8). For instance, as will be described below, a pair of computing devices (e.g., first and second computing devices, such as first and second ECUs) may be positioned within the inner storage compartment 122 of the roof assembly 100 along with various other electronic components (e.g., a modem, router, GPS receiver, and/or the like) used for performing one or more functions, including, but not limited to, controlling one or more components of the work vehicle 10 and/or providing communications between the work vehicle 10 and one or more remote components (e.g., one or more remote computing devices, communications devices, etc.). In one embodiment, one or more of the ECUs may be utilized within or form part of a perception system for allowing the work vehicle 10 to be operated in a partially autonomous, semi-autonomous, and/or autonomous operating mode.

Additionally, as particularly shown in FIG. 3, the roof assembly 100 may include a forward longitudinal section 128 and an aft longitudinal section 130, with the forward longitudinal section 130 generally extending in the longitudinal direction 14 from the forward end 102 of the roof assembly 100 towards the aft longitudinal section 130 and the aft longitudinal section 130 extending in the longitudinal direction 14 from the aft end 104 of the roof assembly 100 towards the forward longitudinal section 128. In one embodiment, the portion of the outer housing 120 of the roof assembly 100 extending along the aft longitudinal section 130 may be configured to define a storage chamber for receiving various internal components of the roof assembly 100, such as the inner storage compartment 122 (and the various components stored therein).

Moreover, in one embodiment, the forward longitudinal section 128 of the roof assembly 100 may incorporate a visibility window 132 that provides an operator within the cab 28 a "view-through" at least a portion of the roof assembly 100. For instance, as will be described below, openings may be defined through one or more components of the roof assembly 100 to allow the visibility window 132 to be formed therein, with the openings being filled or covered by suitable transparent coverings (e.g., glass or polymer window elements or any other suitable transparent elements). In embodiments in which the work vehicle 10 includes a loader assembly (e.g., loader assembly 40), the visibility window 142 may allow the operator to view the loader assembly 40 (including the implement 48) when the boom 42 is moved to a raised position (e.g., a fully raised position at which portions of the implement/boom would otherwise be obscured from view via the forward longitudinal section 128 of the roof assembly 100).

In several embodiments, the roof assembly 100 may also be configured to support various components along its exterior, such as along the outer perimeter of the outer housing 120 of the roof assembly 100. For instance, as shown in FIGS. 2 and 4, one or more exterior component modules 134 may be supported relative to the roof assembly 100, such as by supporting an exterior component module 134 adjacent to each of the four corners of the outer housing 120. In one embodiment, each exterior component module 134 may incorporate, for example, one or more of the following: cameras and/or other sensors or sensing devices: lighting devices: operator notification devices (e.g., visible alarms, audible alarms, etc.), and/or the like. Additionally, one or more components of the cooling system of the roof assembly 100 may be defined or supported at or adjacent to the outer housing 120 along its outer perimeter. For instance, in several embodiments, each sidewall 114, 116 of the roof assembly 100 may define one or more air intake ports 136 for receiving air within the interior of the roof assembly 100 and the aft wall 112 of the roof assembly 100 may define one or more air outlet ports 138 for expelling the air from the interior of the roof assembly 100. In such embodiments, a suitable filter (e.g., intake filter 140 (FIG. 8)) may be supported downstream of the air intake port(s) 136 to filter the incoming air and/or to regulate the airflow therethrough. Additionally, one or more fans (e.g., fans 142 (FIG. 8)) may be supported relative to the air outlet port(s) 138 for generating a vacuum or suction force within the interior of the roof assembly 100 that draws in the airflow through the air intake port(s) 136 and directs such airflow through the roof assembly 100 (e.g., through ducts or airflow channels defined within the roof assembly 100) to the air outlet port(s) 138.

Figure 6:
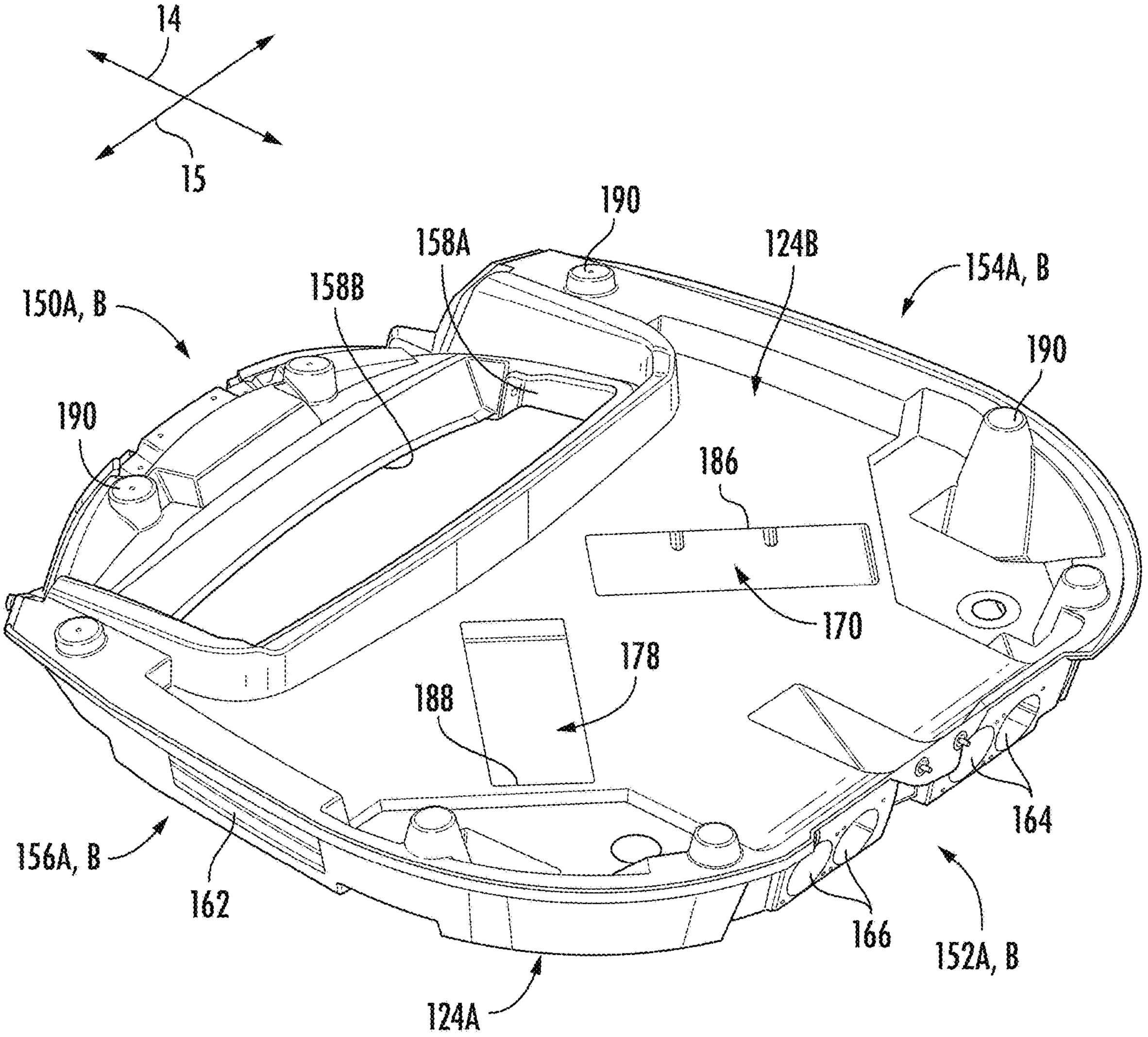
FIG. 6 illustrates an assembled perspective view of one embodiment of internal roof members suitable for use within the disclosed roof assembly in accordance with aspects of the present subject matter.
Figure 7:
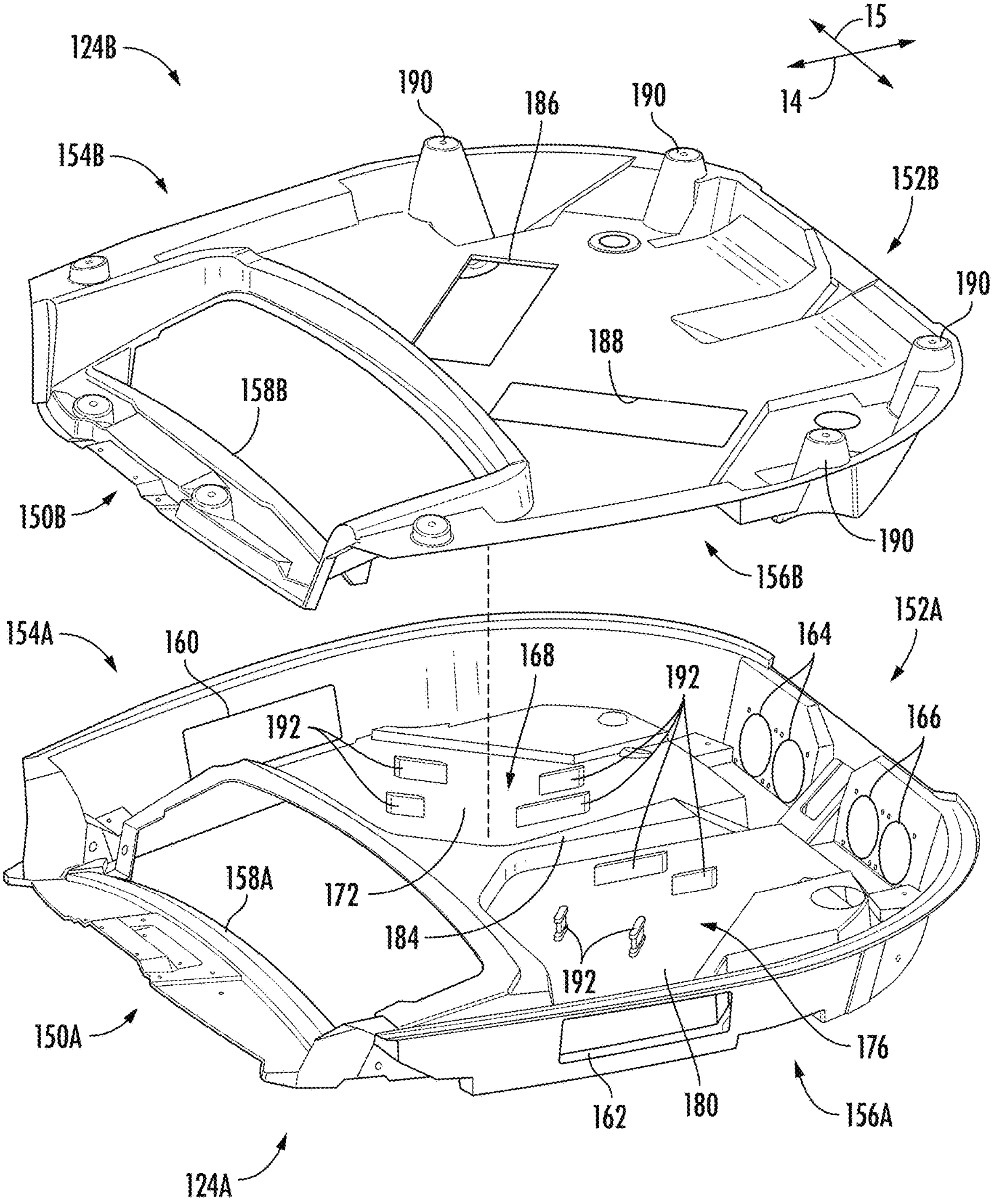
FIG. 7 illustrates an exploded perspective view of the internal roof members shown in FIG. 6, particularly illustrating a lower or first roof member exploded away from an upper or second roof member.
Figure 8:
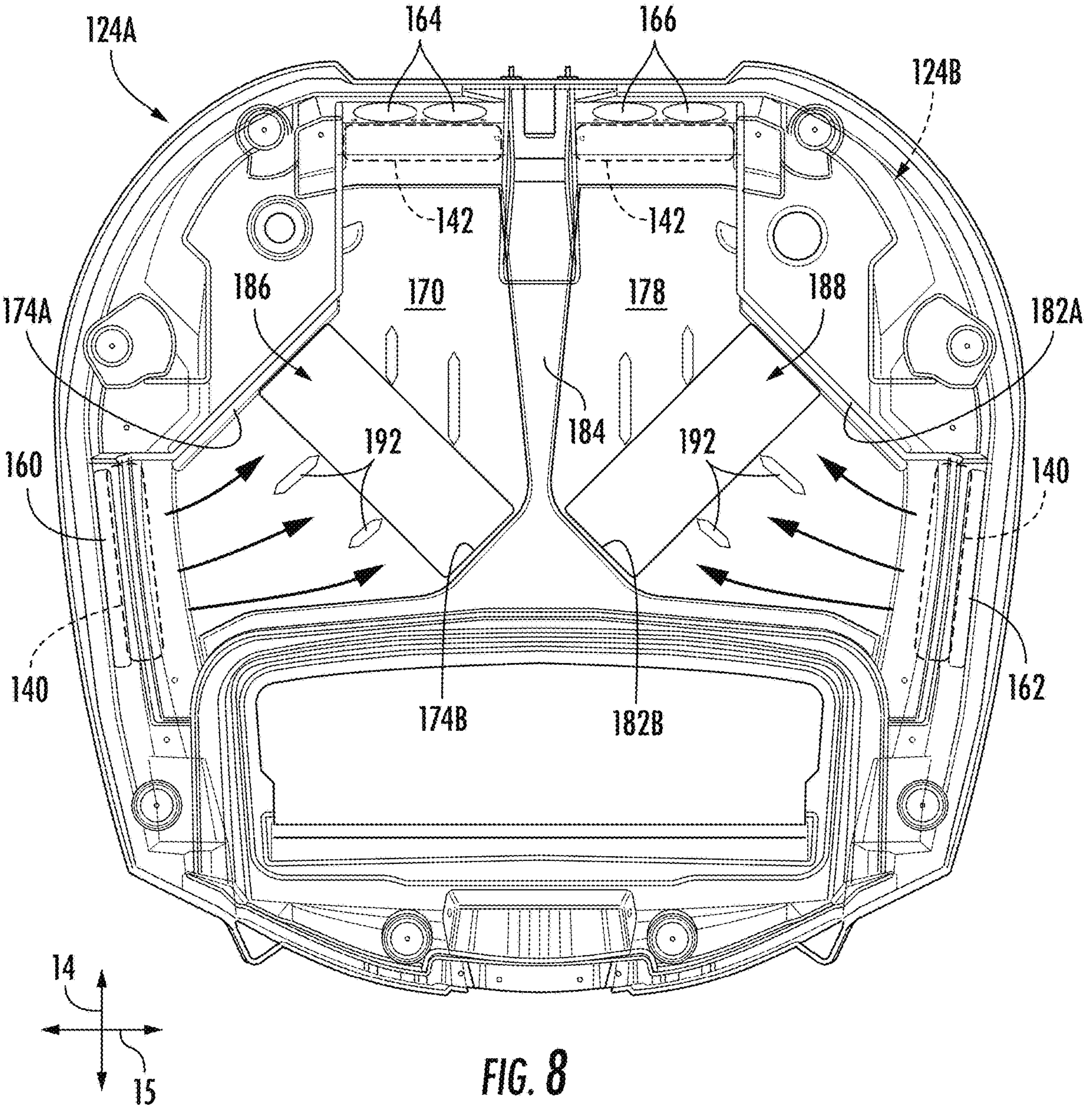
FIG. 8 illustrates a top, assembled view of the roof members shown in FIG. 6, particularly illustrating the second roof member in a partially transparent view to allow the airflow channels defined between the roof members to be visible.

Referring now to FIGS. 6-8, various views of one embodiment of internal roof plates or members 124A, 124B that are configured to be positioned within the outer housing 120 of the roof assembly 100 are illustrated in accordance with aspects of the present subject matter. Specifically, FIGS. 6 and 7 illustrate respective assembled and exploded perspective views of the internal roof members 124A, 124B. Additionally, FIG. 8 illustrates a top view of the assembled roof members 124A, 124B with the top or upper roof member 124B being shown as partially transparent.

In several embodiments, the roof assembly 100 includes a lower or first internal roof member 124A and an upper or second internal roof member 124B. As particularly shown in FIG. 7, each roof member 124A, 124B generally has a plate-like configuration extending in the longitudinal direction 14 between a forward end 150A, 150B configured to be positioned adjacent to the forward end 102 (FIG. 2) of the roof assembly 100 and an aft end 152A, 152B configured to be positioned adjacent to the aft end 104 (FIG. 2) of the roof assembly 100 and in the lateral direction 15 between a first lateral side 154A, 154B configured to be positioned adjacent to the first lateral side 106 (FIG. 2) of the roof assembly 100 and a second lateral side 156A, 156B configured to be positioned adjacent to the second lateral side 108 (FIG. 2) of the roof assembly 100. Additionally, as shown in FIG. 3, each internal roof member 124A, 124B defines a window port 158A, 158B for accommodating the visibility window 132 (FIG. 2) of the roof assembly 100.

As particularly shown in FIG. 7, the lower or first roof member 124A defines first and second air intake openings 160, 162 along its respective first and second lateral sides 154A, 156A that are configured to be aligned within the corresponding air intake ports 136 (FIG. 2) defined in the outer housing 120 of the roof assembly 100. In one embodiment, each intake filter 140 (FIG. 8) of the roof assembly 100 may be configured to be supported relative to or adjacent to a respective air intake opening 160, 162 of the first roof member 124A, such as by positioning each filter 140 within each air intake opening 160, 162 or immediately upstream/downstream of such opening 160, 162. As shown in FIG. 7, the first roof member 124A may also define one or more first and second air outlet openings 164, 166 along its aft side 152A that are configured to be aligned within corresponding air outlet ports 138 (FIG. 4) defined in the outer housing 120 of the roof assembly 100. In one embodiment, one or more suction fans 142 (FIG. 8) of the roof assembly 100 may be supported relative or adjacent to a respective air outlet opening(s) 164, 166 of the first roof member 124A, such as by positioning a single suction fan 142 or an assembly of two or more suctions fans 142 within each air outlet opening(s) 164, 166 or immediately upstream/downstream of such opening(s) 164, 166.

Figure 9:
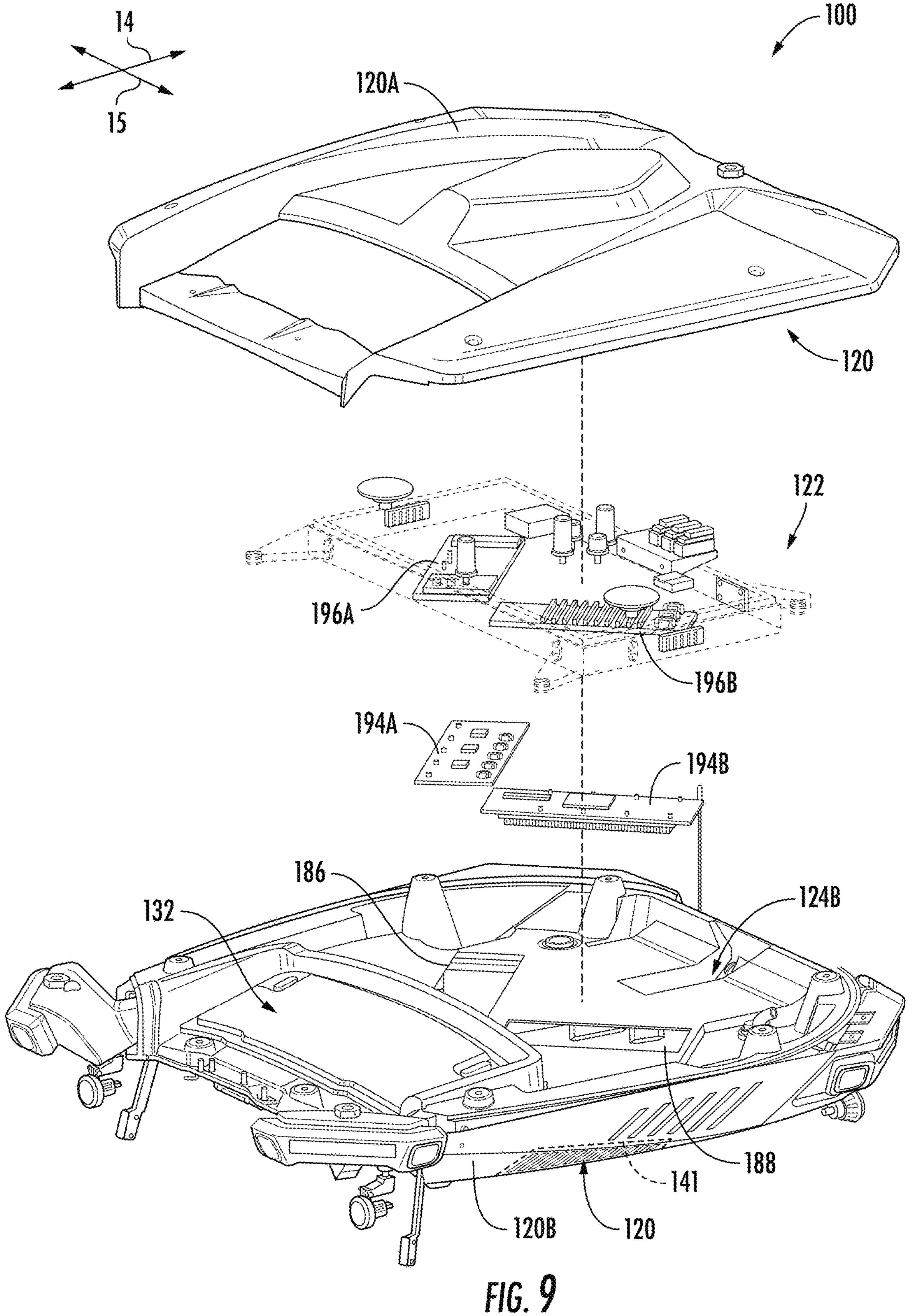
FIG. 9 illustrates a partially exploded, perspective view of the roof assembly shown in FIG. 2, particularly illustrating an upper housing component, an inner storage compartment (and related isolation mounts), and heat-transfer components of the roof assembly exploded away from the remainder of the roof assembly.
Figure 10:
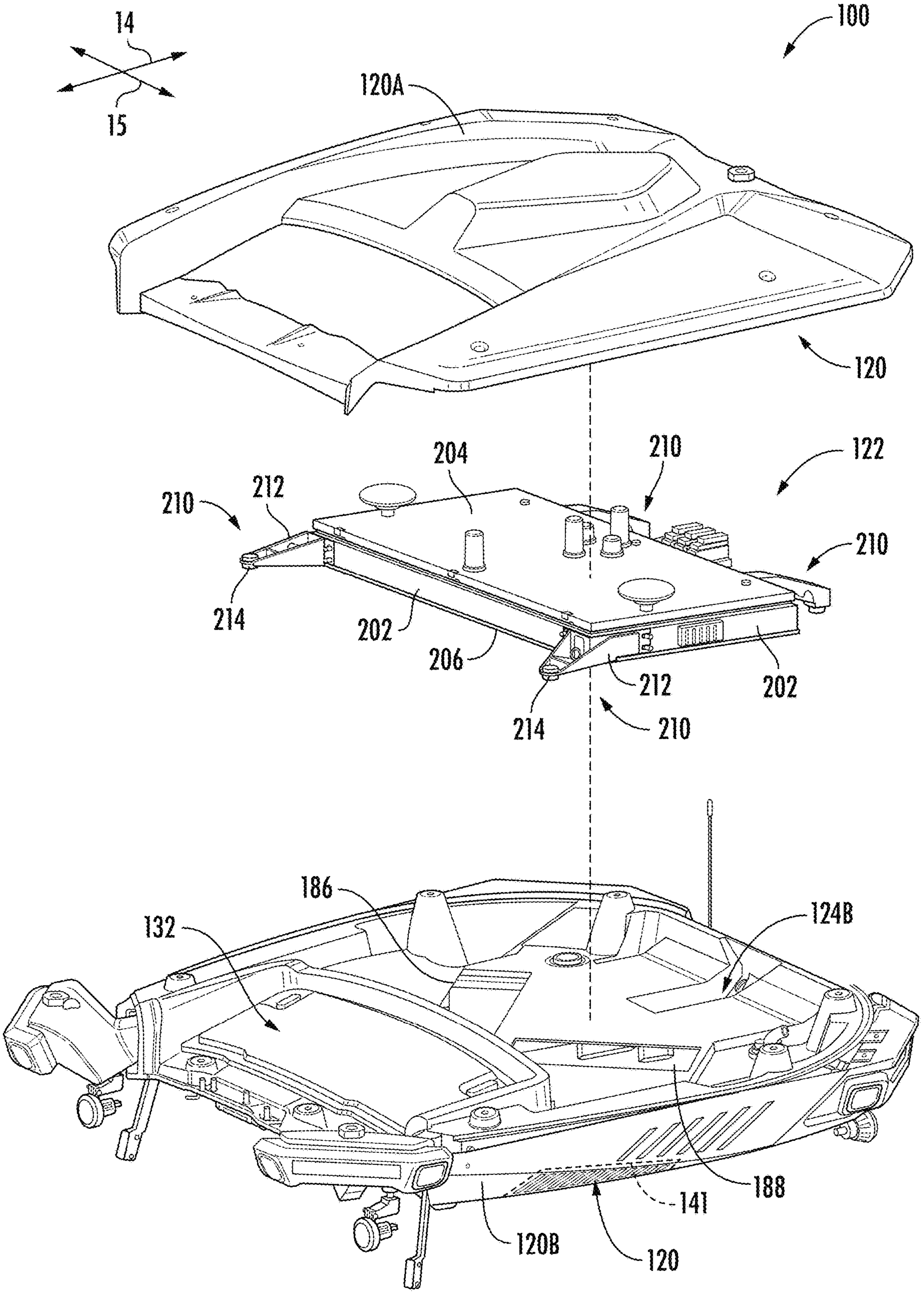
FIG. 10 illustrates another partially exploded, perspective view of the roof assembly shown in FIG. 2, particularly illustrating the upper housing component, the inner storage compartment, and the related isolation mounts of the roof assembly exploded away from the remainder of the roof assembly.
Figure 11:
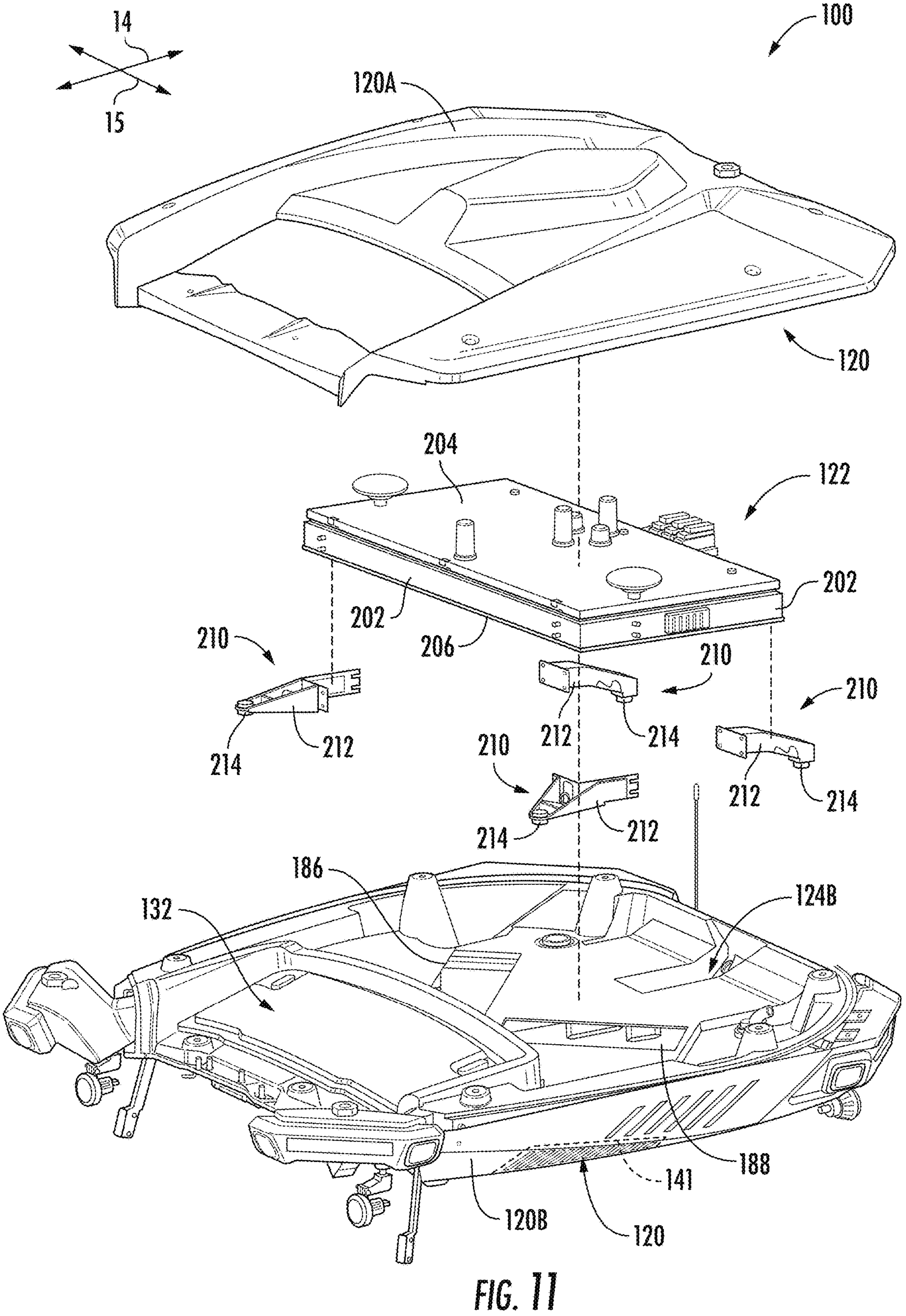
FIG. 11 illustrates a similar partially exploded, perspective view as that shown in FIG. 10 except that the isolation mounts have been exploded away from the inner storage compartment.

It should be appreciated that, in one embodiment, suitable features may be incorporated into the outer housing 120 for allowing the filters 140 to be removed/replaced by the operator from the exterior of the roof assembly 100. For instance, as shown in FIGS. 9-11, access panels 141 (only one of which is shown) may be provided along either side of the outer housing 120 to allow for easy removal/replacement of the filters 140. As an example, the access panels 141 may be removable or movable relative to the remainder of the outer housing 120 to allow an operator quickly and easily remove used filters from the roof assembly 100 and replace them with new filters.

Additionally, as shown in FIG. 7, the first roof member 124A may be configured to define a recessed area extending between each respective set of air intake/outlet openings 160, 162, 164, 166 for at least partially defining an airflow duct or channel between the intake/outlet openings for directing an airflow therethrough. Specifically, in the illustrated embodiment, a first recessed area 168 is defined between the first intake opening 160 and the first outlet opening(s) 164 to at least partially define a first airflow channel 170 (FIG. 8) between such openings 164, 166. Specifically, as shown in FIGS. 7 and 8, the bottom end of the channel 170 is defined by a first recessed wall portion 172 (FIG. 7) of the first roof member 124A and the sides of the channel 170 are defined by opposed raised wall portions 174A, 174B (FIG. 8) extending along the sides of the first recessed wall portion 172 between the first intake opening 160 and the first outlet opening 164. Similarly, in the illustrated embodiment, a second recessed area 176 (FIG. 7) is defined between the second intake opening 162 and the second outlet opening(s) 166 to at least partially define a second airflow channel 178 (FIG. 8) between such openings 162, 166. Specifically, as shown in FIGS. 7 and 8, the bottom end of the channel 178 is defined by a second recessed wall portion 180 (FIG. 7) of the first roof member 124A and the sides of the channel 178 are defined by opposed raised wall portions 182A, 182B (FIG. 8) extending along the sides of the second recessed wall portion 180 between the second intake opening 162 and the second outlet opening 166. In such an embodiment, the top end of each airflow channel 170, 178 is defined by the second roof member 124B upon assembly of such member 124B relative to the first roof member 124A.

It should be appreciated that, in one embodiment, the centrally located raised sidewalls 174B, 182B of the first roof member 124A may form or define a divider wall 184 that functions to divide or separate the two airflow channels 170, 178 from each other upon assembly of the second roof member 124B on top of the first roof member 124A. As a result, each airflow channel 170, 178 may correspond to an independent or isolated airflow channel of the roof assembly 100. Specifically, air entering the first air intake opening 160 flows through the first airflow channel 170 and is expelled therefrom via the first outlet opening(s) 164 while air entering the second air intake opening 162 separately flows through the second airflow channel 178 and is expelled therefrom via the second outlet opening(s) 166 without any crossflow between the airflow channels 170, 178. However, in an alternative embodiment, the airflow channels 170, 178 may be joined together as a common airflow channel or a certain amount of crossflow may be allowed between the two airflow channels 170, 178.

It should also be appreciated that, in one embodiment, the airflow channels 170, 178 may be sealed around their outer perimeters to prevent leakages of air (and potentially dust carried by the air) from the airflow channels 170, 178 and into other portions of the interior of the roof assembly 100. For instance, sealing devices may be provided along/around the outer perimeters of the recessed areas 168, 176 between the first and second roof members 124A, 124B to seal the airflow channels 170, 178 from leakages. As such, all or substantially all of the air entering air intake openings 160, 162 may flow through the respective airflow channel 170, 178 and be expelled via the associated outlet openings 164, 166. Additionally, one or more sealing devices may also be provided between the inner storage compartment 122 and the adjacent roof member 124.

As particularly shown in FIGS. 6-8, the upper or second roof member 124B defines a pair of through-holes or access openings 186, 188 that are generally aligned with the airflow channels 170, 178 (FIG. 8) defined between the first and second roof members 124A, 124B upon assembly thereof. Specifically, the second roof member 124B defines a first access opening 186 that is aligned with and provides access to the airflow being directed through the first airflow channel 170 and a second access opening 188 that is aligned with and provides access to the airflow being directed through the second airflow channel 178. As will be described below, a suitable heat-transfer component 194A, 194B (FIG. 9) may be configured to be at least partially received within each respective access opening 186, 188 to allow the component to extend into the airflow being directed through the corresponding airflow channel 170, 178. As such, heat transferred through the heat-transfer component 194A, 194B (e.g., from a given heat-generating component housed within the inner storage compartment 122 of the roof assembly 100) may be dissipated therefrom via the airflow directed past/across the heat-transfer component 194A, 194B.

As shown in FIGS. 6 and 7, the second roof member 124B may also be configured to include one or more standoff structures 190 for coupling or mounting the outer housing 120 to such roof member 124B. For instance, in the illustrated embodiment, a plurality of standoff structures 190 are formed by the second roof member 124B for coupling an upper shell or housing component 120A (FIG. 9) of the outer housing 120 to the second roof member 124B. In such an embodiment, the standoff structures 190 may ensure, for example, that a suitable storage volume is defined between the upper housing component 120A and the second roof member 124B to allow the inner storage compartment 122 to be positioned therebetween within the interior of the roof assembly 100.

Referring particularly to FIGS. 7 and 8, in one embodiment, the roof assembly 100 may also incorporate one or more flow dividers 192 within each airflow channel 170, 178 defined between the first and second roof members 124A, 125B to provide a more uniform airflow across the channel 170, 178. Specifically, as shown in FIG. 8, the flow dividers 192 are positioned within each airflow channel 170, 178 so as to separate or divide the incoming air received at each air intake opening 160, 162 into three separate airflows at a location upstream of each access opening 186, 188 (i.e., upstream of the position at which the associated heat-transfer component 194A, 194B (FIG. 9) will be exposed to the airflow flowing through the associated airflow channel 170, 178). As such, a more uniform airflow may be directed through each portion of the heat-transfer component 194A, 194B to maximize the heat-transfer capabilities thereof. It should be appreciated that, in addition to being configured to divide the airflow within each airflow channel 170, 178, the flow dividers 192 may also function as structural components of the roof assembly 100. For instance, the flow dividers 192 may be configured to extend vertically between the first and second roof members 124A, 124B to support the second roof member 124B relative to the first roof member 124A along a portion of the length of each airflow channel 170, 178. It should be appreciated that, although the flow dividers 182 are shown as dividing the airflow into three separate airflows, the dividers 182 may be used to divide the airflow into two separate airflows or four or more separate airflows. It should also be appreciated that, in one embodiment, the flow dividers 192 may serve as structural support for the roof members 124A, 124B. For instance, in one embodiment, the roof members 124A, 124B may be bonded together and supported by the dividers 192.

Referring now to FIG. 9, a partially exploded, perspective view of the roof assembly 100 described above with reference to FIGS. 2-8 is illustrated in accordance with aspects of the present subject matter. Specifically, FIG. 9 illustrates an upper shell component 120A of the outer housing 120 of the roof assembly 100 exploded away from a lower shell component(s) 120B of the outer housing 120 to reveal the various internal components of the roof assembly 100. Additionally, the inner storage compartment 122 and associated heat transfer components 194A, 194B of the roof assembly 100 are also shown exploded away from the remainder of the assembly 100, particularly illustrating the inner storage compartment 122 in a partially transparent view to allow the components housed therein to be visible.

As indicated above, each access opening 186, 188 defined in the upper or second internal roof member 124B of the roof assembly 100 may be configured to receive one or more suitable heat transfer components of the roof assembly 100 to allow such component(s) to be positioned at least partially within the airflow being directed through the respective airflow channel 170, 178 (FIG. 8) defined between the adjacent internal roof members 124A, 124B. For instance, as shown in the exploded view of FIG. 9, a first heat-transfer component 194A (e.g., a first heat sync) may be configured to be received and/or mounted within the first access opening 186 to allow suitable heat-transfer members of the component 194A (e.g., fins) to extend into the first airflow channel 170 (FIG. 8) and, thus, allow for heat transfer between such members and the airflow being directed through the channel 170. Similarly, as shown in FIG. 9, a second heat-transfer component 194B (e.g., a second heat sync) may be configured to be received and/or mounted within the second access opening 188 to allow suitable heat-transfer members of the component 194B (e.g., fins) to extend into the second airflow channel 178 (FIG. 8) and, thus, allow for heat transfer between such members and the airflow being directed through the channel 178.

Moreover, each heat-transfer component 194A, 194B may be configured to be thermally coupled (either directly or indirectly) to one or more heat-generating components housed within the inner storage compartment 122 of the roof assembly 100, thereby allowing the heat generated by such component(s) to be transferred to the heat-transfer component(s) 194A, 194B (e.g., via conduction) and subsequently from the heat-transfer component(s) 194A, 104B to the airflow flowing through the respective airflow channel 170, 178 (e.g., via convection). For instance, in the illustrated embodiment, each heat-transfer component 194A, 194B is configured to be thermally coupled to a respective computing device 196A, 196B (e.g., a respective ECU or controller) positioned within the inner storage compartment 122. Specifically, the first heat-transfer component 194A is configured to be aligned with and thermally coupled to the first computing device 196A positioned within the inner storage compartment 122 while the second heat-transfer component 194B is configured to be aligned with and thermally coupled to the second computing device 196B positioned within the inner storage compartment 122. As such, given the isolated airflows being directed through each airflow channel 170, 178, the computing devices 196A, 196B positioned within the storage compartment 122 can be independently cooled via their respective heat-transfer components 194A, 194B and corresponding airflow channels 170, 178.

Figure 12:
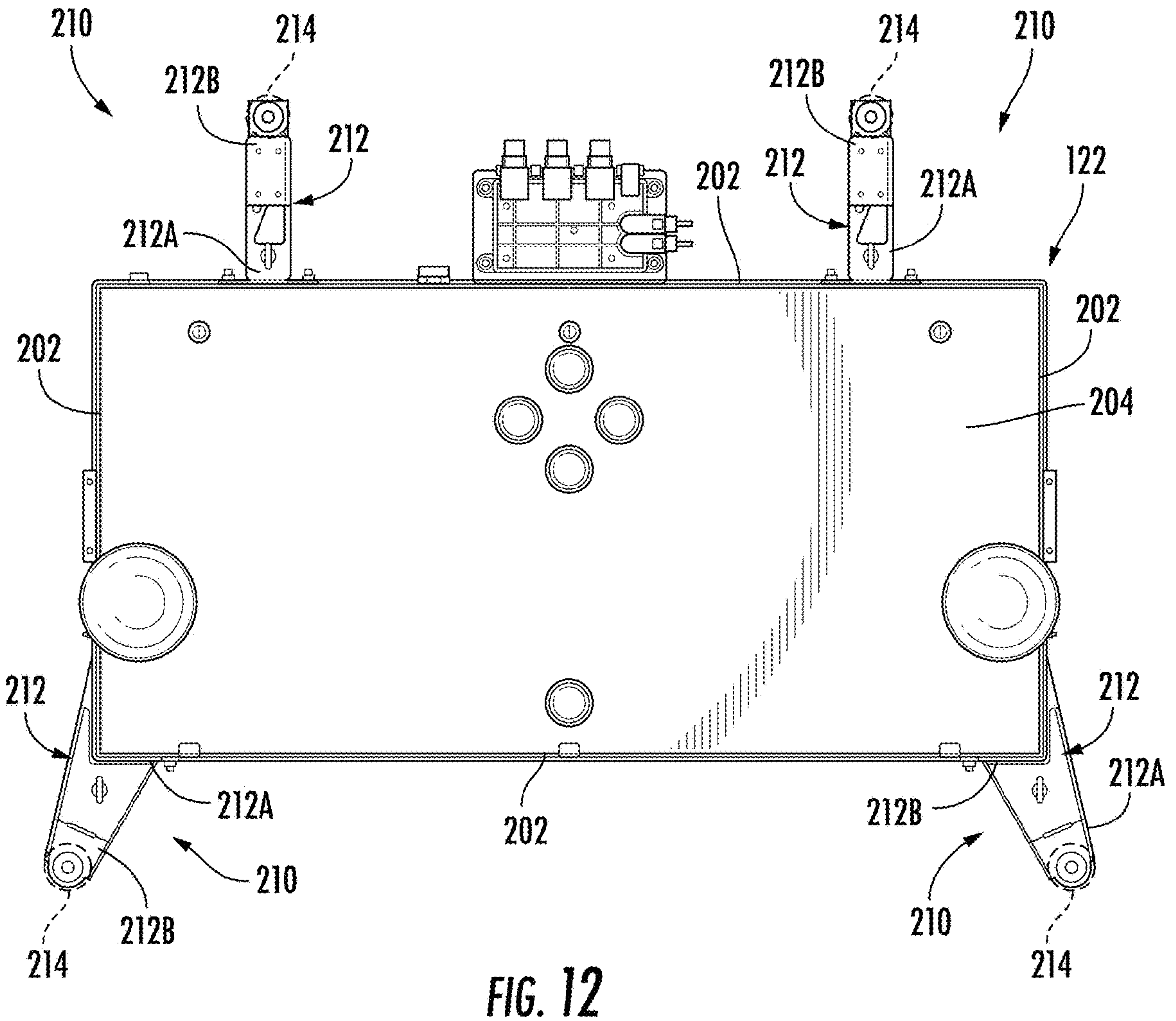
FIG. 12 illustrates a top-down view of the inner storage compartment and isolation mounts shown in FIG. 10.

Referring now to FIGS. 10-12, several views of the inner storage compartment 122 and associated mounting components of the roof assembly 100 described above with reference to FIGS. 2-9 are illustrated in accordance with aspects of the present subject matter. Specifically, FIG. 10 a partially exploded view of the roof assembly 100 with the upper housing component 120A and the inner storage compartment 122 (and associated mounting components) exploded away from the remainder of the roof assembly 100. FIG. 11 illustrates a similar exploded view of the roof assembly 100 shown in FIG. 10 except that the mounting components for the inner storage compartment 122 have been exploded away therefrom. Additionally, FIG. 12 illustrates a top, assembled view of the inner storage compartment 122 and associated mounting components shown in FIGS. 10 and 11.

As indicated above, the inner storage compartment 122 of the roof assembly 100 may, in several embodiments, be configured to perform multiple functions, namely enclosing or encasing one or more electronic components of the work vehicle 10, serving as a FOPS component for the work vehicle 10, and functioning as an EMC cover for the components housed therein. For example, in the illustrated embodiment, the inner storage compartment 122 has a box-like structure or configuration, thereby allowing the storage compartment 120 to define a storage space or volume therein for storing electronic components of the work vehicle 10. Specifically, as shown in FIGS. 10-12, the inner storage compartment includes four sidewalls 202 extending between a top wall 204 and an opposed bottom wall 206 of the storage compartment 122. As such, the various walls 202, 204, 206 may define an enclosed space (e.g., a sealed space) for component storage.

Additionally, in accordance with aspects of the present subject matter, the inner storage compartment 122 may have a suitable configuration that allows the storage compartment 122 to shield the operator's cab from falling objects (e.g., objects falling from the implement 48 of the loader assembly 40 when the boom 42 is raised above the cab 28). For instance, in several embodiments, one or more of the walls 202, 204, 206 defining the box-like structure of the inner storage compartment 122 may be formed from a rigid material, such as a steel material, to allow the inner storage compartment 122 to serve or function as a FOPS component. Specifically, in one embodiment, the top wall 204 of the inner storage compartment 122 may be configured as a rigid plate similar to conventional FOPS-based plates using in cab roofs. Additionally, in one embodiment, the sidewalls 202 and/or bottom wall 206 may also be configured as rigid plates or walls that provide structural integrity to the box-like structure of the storage compartment 122 for accommodating falling objects.

Moreover, to allow the inner storage compartment 122 to function as a FOPs component while also providing the ability to store sensitive electronic components therein, the storage compartment 122 may be configured to be environmentally or vibrationally isolated from the remainder of the roof assembly 100 and the adjacent cab frame to which the roof assembly 100 is secured. Specifically, in several embodiments, the inner storage compartment 122 may be configured to be supported relative to an adjacent component of the roof assembly 100 via isolation mounts 210 that function to minimize the amount of vibrations transmitted through the cab frame and the remainder of the roof assembly 100 to the inner storage compartment 122.

In several embodiments, each isolation mount 210 may include a mounting bracket 212 and a damper 214. As shown in FIGS. 10-12, each mounting bracket 210 may, in one embodiment, be mounted or secured to a portion of the inner storage compartment at a proximal end 212A (FIG. 12) and extend outwardly therefrom to a distal end 212B (FIG. 12) at which the damper 214 is located. The damper 214 may generally correspond to a vibration-dampening component of the isolation mount 210 that is positioned at the interface between the mounting bracket 212 and the adjacent component of the roof assembly 100 to damper vibration transfer between such components. In one embodiment, the damper 214 may correspond to a rubber isolator or other suitable damping mechanism positioned at the interface between the mounting bracket 212 and the adjacent component of the roof assembly 100. For instance, in the illustrated embodiment, the isolation mounts 210 may be configured to be coupled between the inner storage compartment 122 and the second roof member 124B of the roof assembly 100, with each mounting bracket 212 being coupled at its proximal end 212A to the inner storage compartment 122 (e.g., via fasteners) and at its distal end 212B to the second roof member 124B via a suitable fastener(s). In such an embodiment, the dampers 214 generally extend between each mounting bracket 212 and the second roof member 124B to minimize the amount of vibrations transmitted from the roof member 124B to the inner storage compartment 122.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A roof assembly configured for use with an operator's cab for a work vehicle, the roof assembly including:

an outer housing including at least one air intake port provided along at least one lateral side of the outer housing and at least one air outlet port provided along an aft end of the outer housing; and first and second roof members positioned within the outer housing, the first and second roof members collectively defining at least one airflow channel extending between the at least one air intake port and the at least one air outlet port for directing an airflow through an interior of the outer housing;

wherein the airflow is used to cool at least one heat-generating component positioned within the outer housing;

wherein the at least one heat-generating component is housed within an inner storage compartment of the roof assembly, the inner storage compartment being positioned within the outer housing; and wherein the roof assembly further comprises at least one isolation mount coupling the inner storage compartment to one of the first roof member or the second roof member, the at least one isolation mount being configured to reduce an amount of vibrations transmitted between the one of the first roof member or the second roof member and the inner storge compartment.

2. The roof assembly of claim 1, wherein the outer housing includes at least one first air intake port provided along a first lateral side of the outer housing and at least one second air intake port provided along a second lateral side of the outer housing.

3. The roof assembly of claim 2, wherein the outer housing includes at least one first air outlet port and at least one second air outlet port provided along the aft end of the housing, wherein the first and second roof members collectively define a first airflow channel extending between the at least one first air intake port and the at least one first air outlet port and a second airflow channel extending between the at least one second air intake port and the at least one second air outlet port.

4. The roof assembly of claim 3, wherein the first and second airflow channels are isolated from each other.

5. The roof assembly of claim 3, further comprising a first heat transfer component provided in flow communication with the airflow directed through the first airflow channel and a second heat transfer component provided in flow communication with the airflow directed through the second airflow channel.

6. The roof assembly of claim 5, wherein the first heat transfer component is thermally coupled to a first heat-generating component positioned within the outer housing and the second heat transfer component is thermally coupled to a second heat-generating component positioned within the outer housing.

7. The roof assembly of claim 1, further comprising at least one heat transfer component provided in flow communication with the airflow directed through the at least one airflow channel, the at least one heat transfer component being thermally coupled to the at least one heat-generating component.

8. The roof assembly of claim 1, further comprising at least one filter positioned at or adjacent to the at least one air intake port.

9. The roof assembly of claim 8, further comprising an access panel provided along the at least one lateral side of the outer housing to allow access to the at least one filter.

10. The roof assembly of claim 1, further comprising at least one fan positioned at or adjacent to the at least one air outlet port, the at least one fan generating a suction force for intaking the airflow through the at least one air intake port.

11. The roof assembly of claim 1, wherein the inner storage compartment is configured to function as a Falling Objects Protective Structure (FOPS) component for the work vehicle.

12. The roof assembly of claim 1, further comprising one or more openings defined through the outer housing to provide a visibility window for an operator of the work vehicle that allows a view-through at least a portion roof assembly.

13. The roof assembly of claim 1, further comprising one or more flow dividers positioned within the at least one airflow channel to divide the airflow flowing through the at least one airflow channel.

14. The roof assembly of claim 1, wherein the at least one heat-generating component comprises at least one electronic component.

15. A roof assembly configured for use with an operator's cab for a work vehicle, the roof assembly including:

an outer housing including at least one air intake port provided along at least one lateral side of the outer housing and at least one air outlet port provided along an aft end of the outer housing;

first and second roof members positioned within the outer housing, the first and second roof members collectively defining at least one airflow channel extending between the at least one air intake port and the at least one air outlet port for directing an airflow through an interior of the outer housing; and one or more flow dividers positioned within the at least one airflow channel to divide the airflow flowing through the at least one airflow channel;

wherein the airflow is used to cool at least one heat-generating component positioned within the outer housing; and wherein the one or more flow dividers extend vertically between the first and second roof members and support the second roof member relative to the first roof member.

16. The roof assembly of claim 15, wherein the outer housing includes at least one first air intake port provided along a first lateral side of the outer housing and at least one second air intake port provided along a second lateral side of the outer housing.

17. The roof assembly of claim 16, wherein the outer housing includes at least one first air outlet port and at least one second air outlet port provided along the aft end of the housing, wherein the first and second roof members collectively define a first airflow channel extending between the at least one first air intake port and the at least one first air outlet port and a second airflow channel extending between the at least one second air intake port and the at least one second air outlet port.

18. The roof assembly of claim 16, wherein the one or more flow dividers comprise one or more first flow dividers positioned within the first airflow channel and one or more second flow dividers positioned within the second airflow channel.

19. The roof assembly of claim 15, further comprising at least one heat transfer component provided in flow communication with the airflow directed through the at least one airflow channel, the at least one heat transfer component being thermally coupled to the at least one heat-generating component.

* * * * *